United States Patent Office 3,034,981
Patented May 15, 1962

3,034,981
FILTER PAPERS
Armand Jacques Julien Poelman, Paris, and Marc Albert Germain, Draveil, France, assignors of one-half to Etablissements R. Schneider, Paris, and Bernard Dumas & Cie, Creysse (Dordogne), France, both corporations of France
No Drawing. Filed July 10, 1958, Ser. No. 747,604
Claims priority, application France July 19, 1957
4 Claims. (Cl. 210—504)

The present invention relates to filters made with filter paper and intended for the filtration of particles of very small dimensions, particularly 0.3 micron or less.

It is known that the filtering power or efficiency of such filters is higher in proportion as the diameters of the fibers composing the filter paper is smaller, but with very fine fibers the mechanical strength of the filter paper is low.

In order to obtain a high efficiency or filtering power, there have been utilised mixtures of fine-divided asbestos fibers with vegetable fibers, the latter serving to provide mechanical strength. However, these papers will not stand high temperatures, because the vegetable fibers become charred or burnt.

It has likewise been proposed to use very fine glass fibers, which can currently be obtained of diameters well below 1 micron and even down to 0.1 micron. However, filter papers made by means of such fibers are spoiled as soon as the melting point of glass is reached.

The main object of the invention is to provide an improved filter paper of very high efficiency but of sufficient mechanical strength and capable of withstanding temperatures of the order of 1000° C.

Another object of the invention is to provide an improved filter paper of this character having its mechanical strength increased either temporarily to allow of handling and working in the manufacture of the filter, or permanently throughout the life of the filter, even at high temperatures.

Our improved filter paper, composed of asbestos fibers, withstands temperatures of the order of 1000° C., presents a very high efficiency or filtering power, 99.9% or even higher for particles of the order of 0.3 micron, and possesses good qualities as regards mechanical strength and low loss of head by the fluid to be filtered.

Said filter paper is composed of a mixture of asbestos fibers, some of which are of very small diameter, these fine fibers giving the paper its high filtering power, and others are of sufficient diameter and length for conferring on the paper an adequate mechanical strength.

In order to obtain the desired mixture, asbestos fibers (for example Cape asbestos) are carefully subdivided or refined, as in the paper-making mold or trough, the course of the operation being followed with the microscope so as to check the Schoper degree.

By more prolonged refining, the fibers become more finely divided and their mean diameter decreased; thus, by varying the time of refining, say from 5 minutes to several hours, there can be obtained filter papers of which the efficiency or filtering power is increased to any desired extent, while still keeping a paper of constant weight per square meter.

Conversely, if it is desired to maintain the efficiency or filtering power at a fixed value, for example 99.99%, this efficiency can be obtained with filter papers of higher or lower weight per square meter, depending on the length of the time of refining. With extremely prolonged refining, it is possible to attain the filtering power indicated, for a paper of 5 grams per square meter, but such papers have only a low mechanical strength by reason of their very small thickness and the short length and very small diameter of the fibers.

By controlled refining, for about fifteen minutes, there has been obtained a mixture of asbestos fibers comprising short, fine fibers (of a length lying between 0.02 and 0.05 mm. and of a diameter of 0.1 to 0.5 micron) in a proportion by weight of 20%, and longer fibers of a greater diameter (of a length lying betwen 5 and 10 mm. and of a diameter of 5 to 10 microns) in a proportion by weight of 20%, the remainder of the mixture being formed by fibers of intermediate lengths and diameters. Such a proportion of fine fibers gives a very efficient paper from the filtration point of view, while the same proportion of long and thicker fibers confers on the paper a suitable mechanical strength.

The filter paper constituted by such a mixture is particularly advantageous. For a weight of 100 grams per square meter, its filtering power is greater than 99.99% for particles of 0.3 micron diameter. The mechanical characteristics and the loss of head in use of such a paper correspond to the requirements of industrial filters. This paper resists temperatures higher than 1000° C.

If it is desired to increase the mechanical strength of the improved filter paper, it is possible to precipitate upon the fibers inorganic products such as aluminum silicate. Thus it is possible to add upon the fibers, during the refining operation, from 1 to 10% of sodium silicate and to effect the precipitation by addition of aluminum sulfate. The filter paper thus constituted preserves its mechanical properties even after prolonged exposure to a temperature of 1000° C., but the loss of head becomes increased.

If it is desired to increase temporarily the mechanical qualities of the filter paper without increasing to any great extent the loss of head, for example in order to facilitate the subsequent construction of filters by folding, cutting or machining of the paper, there may be precipitated upon the fibers suitable dispersions of organic substances such as vinyl chloride, neoprene, acrylic nitrile, vulcanised latex and so on. The mechanical properties are greatly improved for small quantities of these substances, 1 to 5% by weight in relation to the fibers, but this improvement of the mechanical properties decreases if the paper is raised to temperatures higher than 150° C.; the organic substances will have been lost at such temperatures and there are found again substantially the same mechanical properties as with similar paper made without precipitation of organic substances on the fibers.

What we claim is:

1. A filter paper consisting of asbestos fibers of different size groups, a first group of asbestos fibers having a diameter of between 5 and 10 microns and a length of between about 5 and 10 mm. and being present in an amount of about 20% by weight so as to give said filter paper mechanical strength, a second group of asbestos fibers having a diameter of between 0.1 and 0.5 micron and having a length of between about 0.02 and 0.05 mm. and being present in an amount of about 20% by weight so as to give said filter paper a high filtration power and the remainder of said asbestos fibers being of lengths and diameters intermediate the lengths and diameters of said two groups of asbestos fibers.

2. A filter paper consisting of asbestos fibers of different size groups, a first group of asbestos fibers having a diameter of between 5 and 10 microns and a length of between about 5 and 10 mm. and being present in an amount of about 20% by weight so as to give said filter paper mechanical strength, the second group of asbestos fibers having a diameter of between 0.1 and 0.5 micron and having a length of between about 0.02 and 0.05 mm. and being present in an amount of about 20% by weight so as to give said filter paper a high filtration power and also containing between about 50% and 59% by weight of asbestos fibers of lengths and diameters intermediate the lengths and diameters of said two groups of asbestos fibers, and also containing between 1 and 10% by weight of aluminum silicate.

3. A filter paper consisting of asbestos fibers of different size groups, a first group of asbestos fibers having a diameter of between 5 and 10 microns and a length of between about 5 and 10 mm. and being present in an amount of about 20% by weight so as to give said filter paper mechanical strength, and the second group of asbestos fibers having a diameter of between 0.1 and 0.5 micron and having a length of between about 0.02 and 0.05 mm. and being present in an amount of about 20% by weight so as to give said filter paper a high filtration power and also containing between about 55% and 59% by weight of asbestos fibers of lengths and diameters intermediate the lengths and diameters of said two groups of asbestos fibers, and also containing about 1 to 5% by weight of on organic substance selected from the group consisting of vinyl chloride, neoprene, acrylic nitrile and vulcanized latex particles.

4. A filter paper consisting of asbestos fibers of different size groups, a first group of asbestos fibers having a diameter of between 5 and 10 microns and a length of between about 5 and 10 mm. and being present in an amount of about 20% by weight so as to give said filter paper mechanical strength, the second group of asbestos fibers having a diameter of between 0.1 and 0.5 micron and having a length of between about 0.02 and 0.05 mm. and being present in an amount of about 20% by weight so as to give said filter paper a high filtration power and also containing between about 45% and 58% by weight of asbestos fibers of lengths and diameters intermediate the lengths and diameters of said two groups of asbestos fibers, and also containing between 1 and 10% by weight of aluminum silicate and also containing about 1 to 5% by weight of an organic substance selected from the group consisting of vinyl chloride, neoprene, acrylic nitrile and vulcanized latex particles.

References Cited in the file of this patent

UNITED STATES PATENTS

| | | | |
|---|---|---|---|
| 1,910,771 | Knight | May 23, | 1933 |
| 2,144,781 | Seitz | Jan. 24, | 1939 |
| 2,205,331 | Alton | June 18, | 1940 |
| 2,217,005 | Clapp | Oct. 8, | 1940 |
| 2,407,581 | Smith et al. | Sept. 10, | 1946 |
| 2,507,827 | Stafford | May 16, | 1950 |
| 2,567,558 | Greider et al. | Sept. 11, | 1951 |
| 2,708,982 | McGuff | May 24, | 1955 |
| 2,797,163 | Smith et al. | June 25, | 1957 |